United States Patent
Moberg et al.

(10) Patent No.: US 9,298,907 B2
(45) Date of Patent: Mar. 29, 2016

(54) METHODS FOR ENABLING REAL-TIME DIGITAL OBJECT AND TANGIBLE OBJECT INTERACTIONS

(71) Applicant: SnowShoeFood, Inc., Madison, WI (US)

(72) Inventors: Claus Moberg, Madison, WI (US); Jami Morton, Madison, WI (US); Sheradyn Mikul, Madison, WI (US); Philipe Navarro, Madison, WI (US); Iggy Igner, Madison, WI (US); Isaac Ray, Madison, WI (US)

(73) Assignee: SnowShoeFood, Inc., Madison, WI (US)

( * ) Notice: Subject to any disclaimer, the term of this patent is extended or adjusted under 35 U.S.C. 154(b) by 0 days.

(21) Appl. No.: 14/676,048

(22) Filed: Apr. 1, 2015

(65) Prior Publication Data

US 2015/0278507 A1    Oct. 1, 2015

Related U.S. Application Data

(60) Provisional application No. 61/973,455, filed on Apr. 1, 2014.

(51) Int. Cl.
| | | |
|---|---|---|
| *G06F 21/00* | (2013.01) | |
| *G06F 21/44* | (2013.01) | |
| *G06F 3/044* | (2006.01) | |
| *H04L 29/08* | (2006.01) | |
| *H04L 29/06* | (2006.01) | |

(52) U.S. Cl.
CPC .............. *G06F 21/44* (2013.01); *G06F 3/044* (2013.01); *H04L 63/102* (2013.01); *H04L 67/10* (2013.01); *G06F 2203/04104* (2013.01)

(58) Field of Classification Search
USPC ........................................... 726/2, 4
See application file for complete search history.

(56) References Cited

U.S. PATENT DOCUMENTS

| | | | |
|---|---|---|---|
| 4,123,631 | A | 10/1978 | Lewis |
| 5,559,665 | A | 9/1996 | Taranowski et al. |
| 7,106,221 | B2 | 9/2006 | Horton et al. |
| 7,403,191 | B2 | 7/2008 | Sinclair |
| 7,791,506 | B2 | 9/2010 | Riihimaki et al. |
| 8,206,047 | B1 | 6/2012 | Isaac et al. |
| 8,564,538 | B2 | 10/2013 | Wadsworth |
| 8,648,837 | B1 | 2/2014 | Tran et al. |
| 8,702,512 | B2 | 4/2014 | Mineur et al. |

(Continued)

FOREIGN PATENT DOCUMENTS

| | | | |
|---|---|---|---|
| EP | 2535839 | A1 | 12/2012 |
| GB | 2519798 | A * | 5/2015 |

(Continued)

*Primary Examiner* — Jason Lee
(74) *Attorney, Agent, or Firm* — Jeffrey Schox; Thomas Gwinn

(57) ABSTRACT

A method for authorizing an electronic device includes: detecting, with a capacitive touch sensor, a first set of interaction data from an interaction between the electronic device and a capacitively interactive hardware tool; computing a first set of parametric descriptors from the first set of interaction data; transmitting the first set of parametric descriptors to a remote database system; generating, on the remote database system, a first set of identity data from a comparison of the first set of parametric descriptors with a known set of parametric descriptors; and authorizing, in response to the first set of identity data, the electronic device to perform the action.

18 Claims, 3 Drawing Sheets

(56) References Cited

U.S. PATENT DOCUMENTS

| | | |
|---|---|---|
| 8,816,961 B2 | 8/2014 | Buil et al. |
| 8,854,306 B2 | 10/2014 | Seo et al. |
| 2003/0235452 A1 | 12/2003 | Kraus et al. |
| 2004/0056781 A1 | 3/2004 | Rix et al. |
| 2004/0124248 A1 | 7/2004 | Selker |
| 2006/0256090 A1 | 11/2006 | Huppi |
| 2007/0062852 A1 | 3/2007 | Zachut et al. |
| 2009/0154779 A1* | 6/2009 | Satyan .............. G06K 9/036 382/124 |
| 2009/0193500 A1* | 7/2009 | Griffin et al. ............. 726/2 |
| 2010/0277428 A1 | 11/2010 | Kumazawa |
| 2010/0321304 A1 | 12/2010 | Rofougaran |
| 2011/0157056 A1 | 6/2011 | Karpfinger |
| 2011/0227871 A1 | 9/2011 | Cannon |
| 2012/0007808 A1 | 1/2012 | Heatherly et al. |
| 2012/0007817 A1 | 1/2012 | Heatherly et al. |
| 2012/0120020 A1 | 5/2012 | Lee |
| 2012/0218220 A1 | 8/2012 | Tsai |
| 2012/0249295 A1 | 10/2012 | Yeung |
| 2013/0069908 A1 | 3/2013 | Sung |
| 2013/0083005 A1 | 4/2013 | Arrasvuori |
| 2013/0135246 A1 | 5/2013 | Aubert et al. |
| 2013/0194202 A1* | 8/2013 | Moberg .............. G06F 3/044 345/173 |
| 2013/0232563 A1 | 9/2013 | Ache et al. |
| 2013/0339850 A1 | 12/2013 | Nardi et al. |
| 2014/0046855 A1 | 2/2014 | Moberg |
| 2014/0073300 A1 | 3/2014 | Leeder et al. |
| 2014/0123249 A1* | 5/2014 | Davis et al. .............. 726/5 |

FOREIGN PATENT DOCUMENTS

| | | |
|---|---|---|
| WO | 2006098690 A1 | 9/2006 |
| WO | 2011154524 A | 12/2011 |
| WO | 2012136817 A1 | 10/2012 |
| WO | 2015076605 A1 | 5/2015 |

* cited by examiner

METHODS FOR ENABLING REAL-TIME DIGITAL OBJECT AND TANGIBLE OBJECT INTERACTIONS

CROSS-REFERENCE TO RELATED APPLICATIONS

This application claims the benefit of U.S. Provisional Application Ser. No. 61/973,455, filed on 1 Apr. 2014, which is incorporated in its entirety by this reference.

TECHNICAL FIELD

This invention relates generally to the consumer electronics field, and more specifically to new and useful methods for enabling real-time digital object and tangible object interactions in the consumer electronics field.

BACKGROUND

The link between tangible objects and their digital counterparts is an important part of the entertainment, sales, and security industries. Tangible objects give a sense of ownership, are less easily duplicated than their digital counterparts, and can be transferred through traditional sales methods. Further, they provide a realism of experience unmatched by digital objects. However, linking between tangible and digital objects can be cumbersome and unwieldy, leading to security issues and/or user dissatisfaction. Thus, there is a need in the consumer electronics field to create methods for enabling real-time digital object and tangible object interactions. This invention provides such new and useful methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The following methods are directed to the enablement of real-time digital object and tangible object interactions. Interactions between the digital world and tangible objects are typically mediated by electronic devices. One way to enable these interactions is to allow interactions between tangible objects and electronic devices that sense those objects to affect the digital realm, as accessed by the electronic devices. In this way, tangible objects can interact with digital objects or other data in the digital realm by, for example, authorizing a particular action in software on the electronic devices.

1. Method for Authorizing an Electronic Device to Perform an Action

Figure 1:
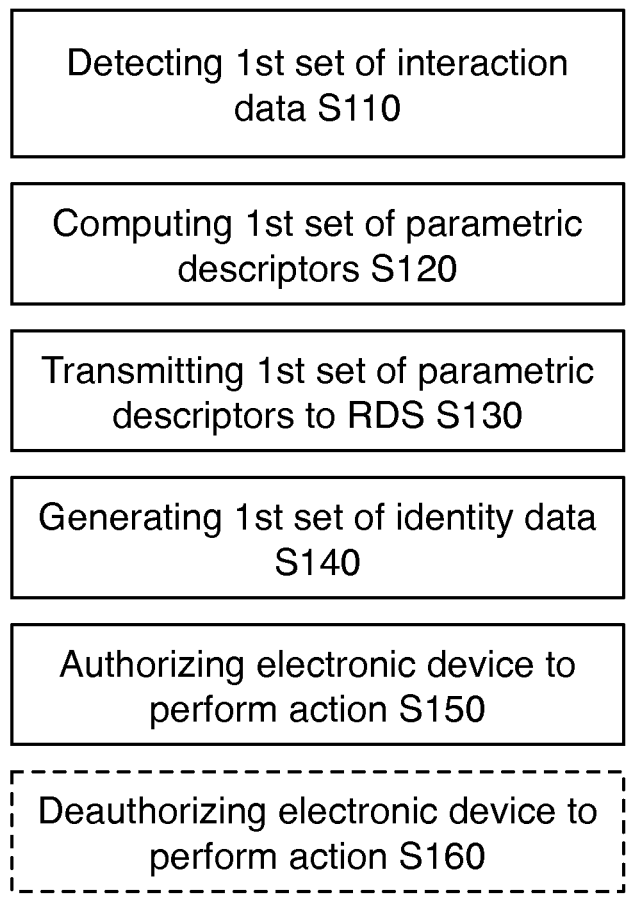
FIG. 1 is a chart view of a method of a preferred embodiment.

As shown in FIG. 1, a method 100 for authorizing an electronic device to perform an action includes detecting a first set of interaction data S110; computing a first set of parametric descriptors from the first set of interaction data S120; transmitting the first set of parametric descriptors to a remote database system S130, generating a first set of identity data from a comparison of the first set of parametric descriptors with a known set of parametric descriptors S140, and authorizing the electronic device to perform an action in response to the first set of identity data S150. The method 100 may additionally or alternatively include deauthorizing the electronic device to perform an action S160.

The method 100 functions to authorize an electronic device to perform an action after detection (preferably locally) and identification (preferably on a remote server) of an identity-augmented tangible object (IATO) configured to enable authorization of that action. An identity-augmented tangible object (IATO) is a tangible object (e.g. a figurine, a toy, a beverage container, or a business card) with detectable physical characteristics that has, through those detectable physical characteristics, been linked to a digital identity. An identity-augmented tangible object may be, for example, a toy containing a near-field communication (NFC) chip that communicates the identity of the toy or identifies the toy as a member of a category of toys, a customer loyalty card containing a quick-response (QR) code, or an individually manufactured capacitively interactive hardware tool. Using IATOs as a means of identification for tangible objects may provide a number of advantages, including increasing authorization security, simplifying ownership transfers, and enhancing user experiences. Authorizing an action via tangible objects may also provide advantages for interaction with the tangible objects; even static objects may, through their ability to authorize an action on an electronic device, offer a dynamic experience. Further, the interaction between the tangible object and electronic devices may provide further advantages; for example, if an electronic device is a geolocation-enabled smartphone, the authorized action might be authorized based on supplementary data related to the electronic device's particular location as well as a particular tangible object.

The method 100 may in particular provide advantages to the entertainment industry. Using the method 100, owners of an IATO may, through electronic devices, be authorized to access dynamic content specific to that IATO. Tangible object manufacturers can control how an individual object owner is authorized to access the dynamic content in a number of ways. For instance, a sports figurine maker may create a series of Andrew Luck (an NFL quarterback) bobbleheads with unique identification characteristics (i.e., each bobblehead is distinguishable from the others by the identification process). Then, dynamic content can be tailored for each individual bobblehead. The sports figurine maker may also choose to make the bobbleheads with identical identification characteristics or semi-identical identification characteristics (e.g., batches sold in different countries have different identification characteristics). In this case, the authorization of access to the dynamic content may simply be related to the bobblehead type and not to the individual owner. Alternatively, the manufacturer may use a combination of bobblehead type and other information (e.g. a user account identified through an electronic device) to tailor dynamic content to users.

The method 100 may also in particular provide advantages to the marketing industry. Using the method 100, proprietors of an establishment may distribute identity-augmented tangible objects to their customers that, when detected by a particular customer's electronic device, authorize the customer to access promotional or advertising content. Alternatively, various locations corresponding to a particular proprietor or business may possess their own unique identity-augmented tangible objects, which can be interacted with by a customer at that location, enabling the customer to receive marketing content specific to that location. For instance, an energy drink company may hold a promotional event in which they distribute small plastic figurines, imbued with set of physical characteristics linkable to an identity, to attendees of the event. Through an application programming interface (API), the energy drink company may establish a link in a remote database between the identification characteristics of the figurines and a particular action to be enabled upon identification of a figurine. For example, an action may be to apply a monetary credit to a user account associated with the electronic device that detects the figurine. A particular attendee, upon interaction with one of the distributed figurines with a smartphone, could then be authorized to have the monetary credit applied to the user account associated with their smartphone. Alternatively, the energy drink company may only authorize this credit if the figurine is detected within a particular time period after the original distribution, or if the detection is performed while the attendee's smartphone is in a particular geographic location (e.g., the event grounds). The energy drink company may additionally or alternatively place limits on how many times monetary credit is applied for a given figurine and/or user account.

Step S110 includes detecting a first set of interaction data from an interaction between an electronic device and an identity-augmented tangible object. Step S110 functions to allow an electronic device to identify a tangible object as a valid (or potentially valid) identity-augmented tangible object, and detect interaction data from the interaction. Step S110 preferably includes identifying a capacitively interactive hardware tool as described in U.S. patent application Ser. No. 13/385,049 and/or U.S. Patent Application No. 61/937,015, both of which are incorporated in their entireties by this reference. Additionally or alternatively, Step S110 may be executed in any other suitable manner, as described below.

Step S110 includes detecting a first set of interaction data. Step S110 functions to enable hardware identification on an electronic device by the identification of some characteristics of an identity-augmented tangible object through an interaction of the identity-augmented tangible object and the electronic device. Step S110 may include detecting interaction data in a number of ways (for a number of different types of interaction). For example, an IATO may have a QR code (that contains an identifying code) readable by a smartphone or other camera-enabled electronic device. As another example, an IATO may have an NFC or RFID tag containing identifying information, which can be read by a NFC or RFID reader. As a third example, an IATO may be shaped in a certain way; the shape of the IATO could be captured by a camera-enabled electronic device. As a fourth example, an IATO may display a particular numerical code, which can be entered into the electronic device by a user. As a fifth example, an IATO may include a capacitively interactive hardware tool, which may be identified by interaction with a smartphone's touchscreen.

Step S110 preferably includes generating hardware interaction data from interaction between an electronic device and an IATO. In the QR code example, this may simply mean translating the QR code to an ASCII string. In the case of an IATO with a particular shape, generating hardware interaction data may include generating a picture of the object, and/or further determining parametric characteristics of the object's shape, and/or further translating those parametric characteristics into an identifying code.

Step S110 may include generating hardware interaction data based on any data related to interaction of an IATO and an electronic device, including any data related to the operating state of the electronic device at the time of interaction.

Interaction data preferably includes data intrinsically linked to physical characteristics of an IATO, but may additionally or alternatively include additional data collected and/or generated during Step S110. For example, interaction data might include whether an IATO matches a known template or not. In the case of the IATO of a particular shape identified by camera, interaction data might consist of a parametric description of the shape only if the shape matches a particular class of shapes. More specifically, if all authenticating shapes are formed from concentric circles, a shape having a square might be rejected by the electronic device (or the interaction data may simply contain a flag that the shape is not a recognized authenticator instead of a parametric description of the shape). Interaction data may also contain spatio-temporal details of the interaction, such as the duration of the interaction or geo-location of the interaction. In the case where the interaction involves bringing a capacitive touch sensor into close proximity of a capacitively interactive hardware tool, interaction data may consist of where on the touch sensor the interaction takes place, and/or whether the interaction consists of moving the hardware tool in a specific manner in the vicinity of the capacitive touch sensor.

Step S120 includes computing parametric descriptors from the interaction data. The interaction data is preferably as described by Step S110, but may additionally or alternatively be any data related to interaction between an electronic device and an identity-augmented tangible object. In one example, object detection and interaction data generation is performed using a QR code and a smartphone. The computed parametric descriptors may include a picture of the QR code, a reproduction of the QR code as read by the smartphone, the data contained with the QR code, and/or data processed from the QR code by the smartphone. Parametric descriptors processed from the QR code might include an identifying code generated from the QR code and/or information that the QR code did not match any known QR code. If a parametric descriptor is contextually known, it may not be computed; for instance, if the detector of interaction data expected data for a particular object, the parametric descriptors transmitted may simply include a "yes" or "no" (in other words, whether the tangible object detection process ended with a predicted result).

Step S130 includes transmitting the computed set of parametric descriptors to a remote database system. The parametric descriptors are preferably as described by Step S120, but may additionally or alternatively be any suitable descriptors related to an identifying representation of detected interaction data. For example, the parametric descriptors may include the absolute spatial orientation of a set of points of capacitive interaction detected when a capacitively interactive hardware tool IATO is placed in proximity of a capacitive touch sensor. Alternatively, computed parametric descriptors may include a reduced set of data pertaining to the relative spatial orientations of each point in the set of points.

Step S130 preferably includes transmitting the parametric descriptors, but may additionally or alternatively transmit other data related to the parametric descriptors. For example, the transmission may be a binary notification, such as a confirmation that parametric descriptors were or were not computed. The transmission preferably occurs via a wireless internet link, but may also occur via Bluetooth, a local wireless network, a wired connection, or any other suitable means of data communication.

Step S130 may additionally or alternatively include transmitting supplementary data. Supplementary data is preferably data related to the state of an electronic device during interaction, but may additionally or alternatively be any suitable data usable during authentication. This supplementary data may be used in a number of ways. For example, the supplementary data might be used to determine proper authorization of an action (for instance, an action may only be authorized by a particular identification method if the identification process occurs at a particular location) and/or as analytical data (for instance, allowing a company to track the locations at which identification occurs for marketing analysis).

The supplementary data may include sensor data from the electronic device; e.g., motion data, compass data, touch data, location data, and/or audio/video data. The supplementary data may additionally or alternatively include contextual data; e.g., what apps were running on the electronic device at the time of identification, what percentage of storage capacity on the electronic device is free, and/or what operating system the electronic device is running. The supplementary data may additionally or alternatively include historical data; e.g., how often the electronic device has run a particular app over the past five days, which purchases have been made by the electronic device, and/or how often the electronic device has been used. Contextual and/or historical data may be specific to a particular app or action. As one example, a user touches a plastic axe containing a capacitive interface to a smartphone to perform a special attack while playing a game; when the smartphone sends interaction data it might also send supplementary data about the user's performance in the game. This supplementary data could be used to identify if the user's performance was in the top ten percent of users globally that day, and if so, grant an extra bonus to the performance of the special attack in game. As another example, a user touches a smartphone to a plastic stamp containing a capacitive interface while in a particular coffee shop; when the smartphone sends the interaction data it may also send supplementary data about the location of the coffee shop and/or the smartphone, and/or the number of times the user has detected the interaction data corresponding to this particular plastic stamp in the previous week, or over any period of time.

Steps S110, S120, and S130 are preferably performed by the electronic device of the method 100. The electronic device is preferably a smartphone or tablet, but may additionally or alternatively be any suitable electronic device capable of interfacing with an identity-augmented tangible object, obtaining interaction data, and computing parametric descriptors. Some other examples of electronic devices include laptops, media players, cameras, measurement devices, gaming systems, vehicular computing devices, set-top boxes, televisions, NFC readers, RFID readers, and smart-card readers.

Step S140 includes generating a first set of identity data from a comparison of the transmitted parametric descriptors with a known set of parametric descriptors contained in the remote database system. The parametric descriptors are preferably as described by Steps S120 and S130, but alternatively may be any suitable parametric descriptors of the interaction data detected in Step S110. Identity data is preferably data that represents whether or not a detected IATO possesses the correct identity augmentation in order to authorize an action.

For example, an IATO may be uniquely identified by an NFC chip with a particular characteristic signal, that characteristic signal may in turn be linked with a set of identity data stating that the IATO may be used to open a particular set of electronically-actuated doors. An electronic device with an NFC-enabled reader detects the characteristic signal, and computes from the signal a set of parametric descriptors (e.g. a digital representation of the frequency components of the signal) and transmits them to a remote database system. The remote database system may contain a known set of digital representations of frequency components of signals corresponding to the identities of many identity-augmented tangible objects. The remote database system compares the transmitted set to the known set and determines if the tangible object's parametric descriptors are recognized as a member of the known set. If so, the IATO (and/or the electronic device) may be linked with data corresponding to the known member.

Examples of linked data may include information about the identity of the object used for hardware identification, content linked to the object used for hardware identification, ownership information relating to the object used for hardware identification, and/or user stored information relating to the object used for hardware identification. Linked data may not necessarily be linked directly to the object; another example of linked data includes archived financial data behind a pay wall that can be accessed using one of several different identification methods; in this case, the data may be simply linked to a successful identification of a user using any of those methods.

In addition to modification based on IATO interaction, linked data may also be modified based on data administrator input. Data administrators are preferably any users with administrator access to linked data. If linked data is related to a game, the data administrators might include game developers. For example, a set of ID tokens are given to a group of users by a webmaster, allowing the users access to hidden parts of a website when the token is used. The webmaster may monitor access and/or other usage data linked to the users. Additionally, the webmaster may modify the linked data corresponding to each token (and relatedly, the level of access given by the token). Data administrator input is preferably sent over the internet, but additionally or alternatively may be sent by any suitable method.

Step S140 is preferably performed by a computer server or cloud service, but may additionally or alternatively be performed by any computing device capable of receiving interaction data and/or parametric descriptors of the interaction data. Preferably, the remote database system is a unified computing architecture in which data can be stored and computed on locally, in order to increase speed and reduce latency. Alternatively, the remote database system may contain geographically and virtually disparate components, each responsible for the various substeps of receiving data, transmitting data, storing data, and/or computing on data that may be contained in the steps of the method 100. The remote database system preferably contains a database service (e.g. Firebase) that syncs in real-time with electronic devices used with the method 100, but may additionally or alternatively be any suitable database service.

Step S150 includes authorizing the electronic device to perform an action. Step S150 preferably authorizes the electronic device to perform the action based on the identity data as described by Step S140, but may additionally or alternatively authorize the performance of the action based on any other suitable data. For example, if the parametric descriptors and/or supplementary data do not match any data contained in the remote database system, the action authorized by Step S150 may be to notify a user of the electronic device that there was no match to the detected identity-augmented tangible object. Other examples for the action to be authorized include displaying information about the identified object on the screen of the electronic device; reporting statistics on the number of times and/or locations in which the object has been identified; providing enhanced permissions or altered status to the electronic device and/or a user of the electronic device; and confirming that the object has been detected and that its parametric descriptors have been compared against the known set in the remote database system. Alternatively, the action that is authorized can be to do nothing and wait for additional data and/or instructions. For instance, the identity data may be an identifier for a particular action figurine. This particular action figurine, when used during a game, gives the user a higher chance to attack, but only if the user had not already used the figurine in the past five minutes. In this case, authorizing an action might involve querying the electronic device for linked identity data to see if that figurine had been used in the past five minutes, and authorizing the use of any benefits afforded to the user of the particular action figurine in the game if the query generated an affirmative response. In a related example, the identity data is linked to a particular user account in the remote database system, and the authorized action might be to augment the gameplay in accordance with specific information contained in the identity data linked to the user account, such as by increasing the chance for the user to successfully attack in the game. As another example, the identity data might include an identifier for an identification token belonging to a homeowner. The identification token, when used with an app on the user's smartphone, allows the user to unlock the doors to his or her house. Authorizing an action in this instance includes directing the electronic locks of the house to disengage.

Authorizing an action based on the first set of identity data S150 may include modifying identity data and/or other data in the remote database system. For example, the remote database system may keep track of how many times a particular action figurine or customer loyalty token is used; authorizing an action would include updating the use count in the database.

If the authorized action included performing an additional action or modifying data in the database, Step S150 may include sending status or other information related to the authorization. For instance, if the response included unlocking a door, Step S150 may include sending a notification that the door was successfully unlocked.

Step S150 may additionally or alternatively include authorizing an additional electronic device to perform an action. For example, if the action includes, in a game, allowing the user to hit another player for ten damage based on the use of an action figurine, Step S150 may include authorizing sending both the user and the other player notification of the damage, as well as potentially applying the damage to both users.

Figure 2:
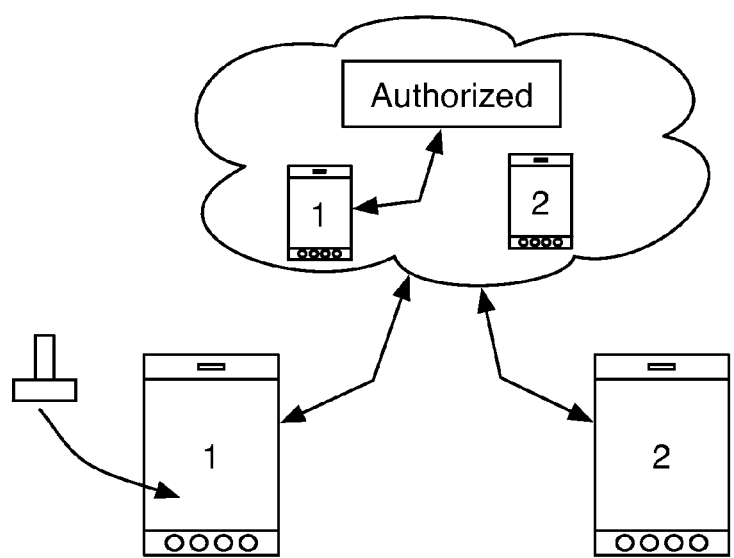
FIG. 2 is an example view of a authorization transfer of a method of a preferred embodiment.
Figure 2:
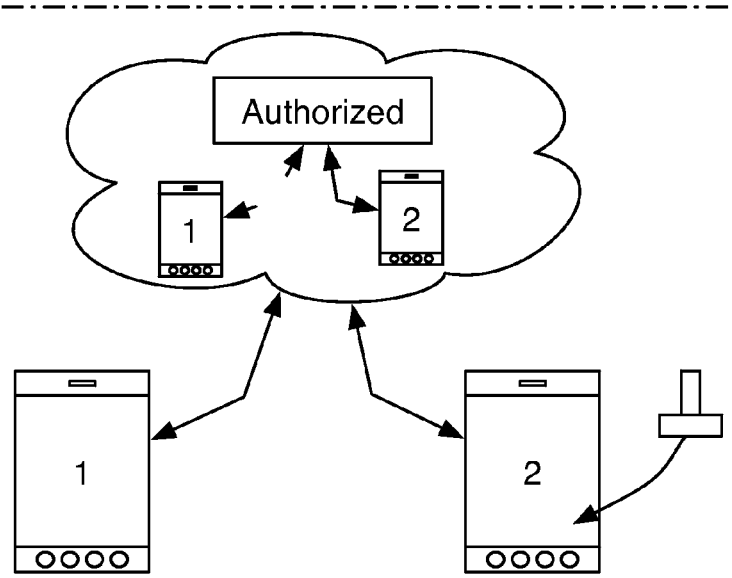

As shown in FIG. 2, the method 100 may be used to enable the transfer of authorization (or ownership) between multiple mobile electronic devices using a single identity-augmented tangible object. The method 100 is used to authorize a first action on a first electronic device using the IATO. Then, the method 100 is used to authorize a second action on a second electronic device using the IATO (the actions may or may not be the same). In this particular example, the authorization of the second action includes modifying identity data linked to the IATO. This identity data was, due to the first authorization, associated with the first electronic device and/or first action; after modification due to the authorization of the second action, the identity data is no longer associated with the first electronic device, resulting in a deauthorization.

Step S160 includes deauthorizing an electronic device to perform an action. Step S160 is preferably substantially similar to Step S150, in effect, performing deauthorization of an action may be identical to performing an action that negates the effect of a previous action. As in Step S150, Step S160 may include triggering an action (i.e., deauthorization of a previously authorized action) on multiple devices.

Step S160 may be particularly useful to enact transfer of ownership of digital goods related to a tangible object. For example, a CD may include a QR code that gives ownership of a set of exclusive digital tracks (downloadable from the internet) to the owner of the CD; redemption of the QR code by a first owner of the CD allows the owner to download the digital tracks. If the code is redeemed by a second person, the tracks may be deleted from devices owned by the first person and added to devices owned by the second person.

For example, authorization of an action on a first device may trigger deauthorization of an action on a second device in real-time, regardless of the state of the second other device.

Note that while interactions describing two devices are described here, these interactions may be extended to any number of electronic devices and/or identity-augmented tangible objects.

2. Example Use Cases for Method 100

A first example involves the use of the method 100 for a multiplayer video game played on tablets. Players of the game can purchase toys that have a unique capacitive profile. Each toy represents a particular in-game character that the user can play in the game. When a player first presses a capacitively interactive interface of the toy to the tablet during the game, the tablet determines a toy ID number from the toy. The tablet then sends the toy ID and the account ID used to purchase the game over the internet to a game server in the cloud, which receives both pieces of data. The game server checks to see if the toy has been used before; since it hasn't, the toy ID and account ID are linked to a set of default statistics for the character (e.g. level, attack power, defense power, etc.) and stored in a database of the game server as linked data. The game server then sends these default statistics to the tablet. As the player continues to play the game with the toy, data from the game is also stored in the database signifying the progress of the character (linked to the toy ID and account ID). Since the database is hosted in the cloud, large amounts of data relating to the game can be stored and used to measure character progress. Whenever the player uses the toy to activate his character in the game, the toy ID and account ID are again sent to and received by the game server. The game server queries the database with the toy ID and account ID, which recognizes both IDs and finds the updated statistics linked to both IDs and then sends the updated statistics to the tablet. After some time, the player has an extremely powerful character, and decides to sell the figure to a second player. When the second player first uses the toy to activate the character, the toy ID is sent along with a new account ID and both are received by the game server. The game server queries the database with the toy ID and new account ID. The game server recognizes the ID but sees that it is associated with a different account ID, so the game server removes the link to the old account ID (preventing the first player from playing with the character) and adds a link to the new account ID. The game server then sends the statistics linked to the toy ID to the second player's tablet.

Figure 3:
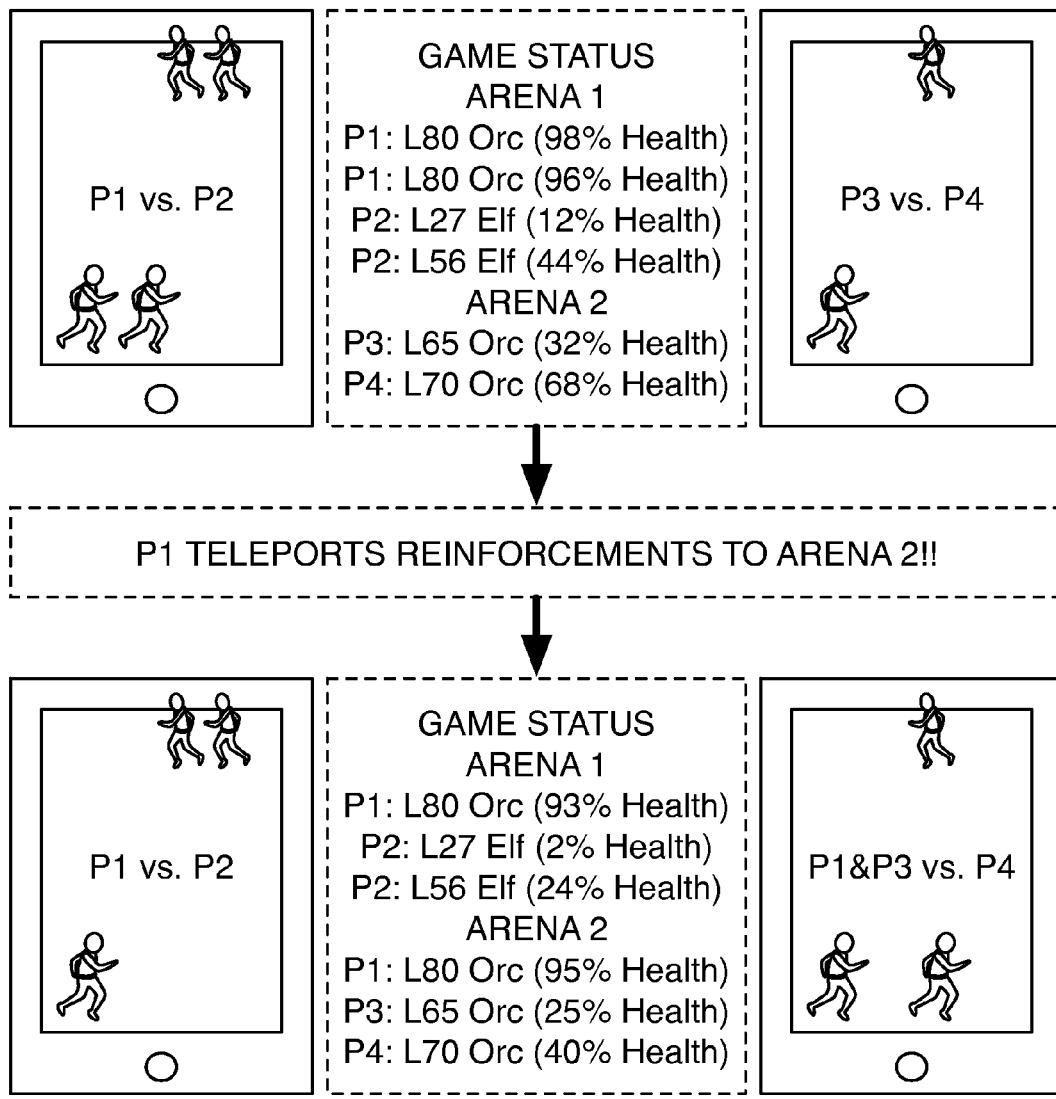
FIG. 3 is a diagram view of an example use case of a method of a preferred embodiment.

A second use case involves the use of the method 100 for conflict resolution of a tabletop game. The game is played with toys having unique capacitive profiles on a large map. Pieces are moved across the map to claim territory. When the pieces of two or more players land in the same spot on the map, a tablet is used for a battle simulation that determines who will occupy the map. To start the battle simulation, a battle simulator app is loaded on a tablet. Then, an authenticator token, having a unique capacitive profile, is pressed to the tablet screen. This authenticator token is owned by the game master, who programs the parameters of the game into a database of a battle server using a web interface linked to the authenticator token ID. The authenticator token was given to the game master by a comic book store, which set a restriction that the authenticator token would only work on tablets physically located within the comic book store. When the authenticator is pressed on the tablet, it is recognized as being located within the comic book store and the battle server sends the appropriate battle simulation parameters to the tablet. To allow simultaneous battles, a second tablet in the comic book store also loads the battle app, and the same authenticator token is used to send the battle simulation parameters to the second tablet. A first player and a second player touch their toys to the first tablet, while a third and a fourth player touch their toys to the second tablet. The positioning of the toys on the tablets is linked to an attack type; toys placed on the far edges of the tablet use a ranged attack, while toys placed close to the center use a melee attack. When the toys are placed, their position and toy ID is sent along with a tablet ID, and the battle simulation begins. After some time, the first player notices that while he is winning handily, his ally (the third player) is about to lose to the fourth player. As shown in FIG. 3, the first player decides to transfer one of his toys from the first tablet to the second tablet, initiating a teleport action. When the tablet is placed on the second tablet, it is recognized as having previously been on the first tablet; the linked object in the game immediately disappears from the first tablet and appears on the second tablet (enabled by the real-time database used by the game server), where it can be used in that battle as reinforcements.

A third use case involves the use of the method 100 to control access to an exclusive wine club. Founding members of the wine club are distributed a gold corkscrew with an embedded NFC tag. The NFC tag of the corkscrew can be used with a smartphone app to modify the details of a member's account (e.g. the delivery address, payment options, wine preferences). The corkscrew can also be used by a member to initiate one new member into the club per month. For a new member to be initiated, a founding member must use the NFC chip of the corkscrew with an unregistered device, which prompts the new member to set up a membership account. Each new member's account is linked to the account of the founding member who enabled their joining, allowing the wine club to keep track of recruitment.

A fourth use case involves the use of the method to enable the authorization of real-time polling of attendees at a large sporting event in an arena. Each seatback in the arena contains a QR code corresponding to that specific seat. When a question is displayed to attendees on a large screen, they may use a smartphone app to scan the QR code and be thereby authorized to participate in answering the question via the same app or a different app. Each QR code may be unique, such that each attendee can vote in the poll only a single time. Alternatively, the QR code may be semi-unique, and contain information regarding the general location of the seat or the price point of a ticket for the seat, enabling a proprietor of the arena to collect real time polling data on attendee experiences that are categorized by this supplementary data. This use of the method allows an owner or operator of a sports arena to improve and streamline their service in real time and with high-fidelity user-specific data.

The methods of the preferred embodiment and variations thereof can be embodied and/or implemented at least in part as a machine configured to receive a computer-readable medium storing computer-readable instructions. The instructions are preferably executed by computer-executable components preferably integrated with a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for authorizing an electronic device having a capacitive touch sensor to perform an action, the method comprising:
   detecting, with the capacitive touch sensor, a first set of interaction data from an interaction between the capacitive touch sensor and a capacitively interactive hardware tool, the capacitively interactive hardware tool comprising a substrate, a set of capacitive contact areas arranged in a spatial pattern on the substrate, and a current coupler electrically coupled to the set of capacitive contact areas wherein proximity of the set of capacitive contact areas of the capacitively interactive hardware tool to the capacitive touch sensor results in a detected change of capacitance at the capacitive touch sensor when the current coupler is electrically coupled to a current sink or current source;
   computing, on the electronic device, a first set of parametric descriptors from the first set of interaction data;
   transmitting the first set of parametric descriptors to a remote database system;
   transmitting supplementary data to the remote database system, wherein the supplementary data comprises a physical location of the electronic device and a time stamp;
   generating, on the remote database system, a first set of identity data from a comparison of the first set of parametric descriptors with a known set of parametric descriptors, the known set of parametric descriptors contained in the remote database system; and
   authorizing, in response to the first set of identity data, the electronic device to perform an action.

2. The method of claim 1, wherein the first set of interaction data comprises a first set of points of capacitive interaction resulting from proximity of the capacitively interactive hardware tool to the capacitive touch sensor.

3. The method of claim 2, wherein the first set of points of capacitive interaction is arranged in a spatial pattern.

4. The method of claim 3, wherein points of the first set of points of capacitive interaction are detected simultaneously.

5. A method for authorizing an electronic device to perform an action, the method comprising:
   detecting a first set of interaction data from an interaction between a hardware sensor of the electronic device and an identity-augmented tangible object, wherein the identity-augmented tangible object occupies a three-dimensional volume and has a mass; wherein the identity-augmented tangible object comprises electrically conductive material;
   computing, on the electronic device, a first set of parametric descriptors from the first set of interaction data;
   transmitting the first set of parametric descriptors to a remote database system;
   transmitting supplementary data to the remote database system, wherein the supplementary data comprises a physical location of the electronic device and a time stamp;

generating, on the remote database system, a first set of identity data from a comparison of the first set of parametric descriptors with a known set of parametric descriptors, the known set of parametric descriptors contained in the remote database system; and authorizing, in response to the first set of identity data and the supplementary data, the electronic device to perform a first action.

6. The method of claim 5, wherein the supplementary data contains a time of interaction for the first set of interaction data.

7. The method of claim 5, wherein the supplementary data contains information about a user of the electronic device.

8. The method of claim 5, wherein the electronic device includes a capacitive touch sensor; wherein detecting a first set of identification data comprises detecting, on the capacitive touch sensor, a first set of points of capacitive interaction resulting from proximity of the identity-augmented tangible object to the capacitive touch sensor.

9. The method of claim 8, wherein the first set of points of capacitive interaction is arranged in a spatial pattern.

10. The method of claim 9, wherein points of the first set of points of capacitive interaction are detected simultaneously.

11. A method for authorization transfer between first and second mobile electronic devices using a single identity-augmented tangible object, the steps comprising:

detecting a first set of interaction data from an interaction between a hardware sensor of the first mobile electronic device and the identity-augmented tangible object; wherein the identity-augmented tangible object occupies a three-dimensional volume and has a mass; wherein the identity-augmented tangible object comprises electrically conductive material;

computing, on the first mobile electronic device, a first set of parametric descriptors from the first set of identification data;

transmitting the first set of parametric descriptors to a remote database system;

transmitting supplementary data to the remote database system, wherein the supplementary data comprises a physical location and a time stamp; wherein the physical location comprises a physical location of one of the first and second mobile electronic devices;

generating, on the remote database system, a first set of identity data from a comparison of the first set of parametric descriptors with a known set of parametric descriptors, the known set of parametric descriptors contained in the remote database system;

authorizing, in response to the first set of identity data, the first mobile electronic device to perform a first action;

detecting a second set of interaction data from an interaction between a hardware sensor of the second mobile electronic device and the identity-augmented tangible object;

computing, on the second mobile electronic device, a second set of parametric descriptors from the second set of identification data;

transmitting the second set of parametric descriptors to a remote database system;

generating, on the remote database system, a second set of identity data from a comparison of the second set of parametric descriptors with the known set of parametric descriptors;

deauthorizing, in response to the second set of identity data, the first mobile electronic device to perform the first action; and authorizing, in response to the second set of identity data, the second mobile electronic device to perform a second action, such that authorization is transferred from the first mobile electronic device to the second mobile electronic device by way of the interaction between the hardware sensor of the second mobile electronic device and the identity-augmented tangible object.

12. The method of claim 11, wherein the first action and the second action are identical actions.

13. The method of claim 11, wherein deauthorizing comprises deauthorizing in response to authorizing the second mobile electronic device.

14. The method of claim 11, wherein the first set of parametric descriptors and the second set of parametric descriptors are identical.

15. The method of claim 11, wherein the identity-augmented tangible object includes an identifier selected from a group of identifiers consisting of an NFC tag, a QR code, and a capacitively interactive hardware tool.

16. The method of claim 15, wherein detecting a first set of identification data comprises detecting, on a capacitive touch sensor of the first mobile electronic device, a first set of points of capacitive interaction resulting from proximity of the capacitively interactive hardware tool to the capacitive touch sensor.

17. The method of claim 16, wherein the first set of points of capacitive interaction is arranged in a spatial pattern.

18. The method of claim 17, wherein points of the first set of points of capacitive interaction are detected simultaneously.

* * * * *